US005111030A

United States Patent [19]

Brasington et al.

[11] Patent Number: 5,111,030

[45] Date of Patent: May 5, 1992

[54] POSTAL CHARGE ACCOUNTING SYSTEM

[75] Inventors: Glynn M. Brasington; John L. Jones, both of Harlow, United Kingdom

[73] Assignee: Pitney Bowes Inc., Stamford, Conn.

[21] Appl. No.: 714,363

[22] Filed: Jun. 12, 1991

Related U.S. Application Data

[63] Continuation of Ser. No. 7,423,690, Oct. 18, 1989, abandoned, which is a continuation of Ser. No. 7,153,304, Feb. 8, 1988, abandoned.

[51] Int. Cl.[5] .......... G06F 15/20

[52] U.S. Cl. .......... 235/375; 235/380

[58] Field of Search .......... 235/375, 380, 382; 364/464, 466, 467

[56] References Cited

U.S. PATENT DOCUMENTS

| | | | |
|---|---|---|---|
| 4,218,011 | 8/1980 | Simjian | 235/375 |
| 4,629,871 | 12/1986 | Scribner | 235/375 |
| 4,821,915 | 4/1989 | Baer et al. | 235/375 |

FOREIGN PATENT DOCUMENTS

| | | | |
|---|---|---|---|
| 0207492 | 1/1987 | European Pat. Off. . | |
| 0208231 | 1/1987 | European Pat. Off. . | |
| 240360 | 10/1986 | Japan | 15/20 |
| 240369 | 10/1986 | Japan . | |
| 172493 | 7/1987 | Japan . | |
| 2173738A | 4/1985 | United Kingdom . | |

*Primary Examiner*—Harold Pitts
*Attorney, Agent, or Firm*—Charles R. Malanadra, Jr.; David E. Pitchenik; Melvin J. Scolnick

[57] ABSTRACT

In a postal charge accounting system, a control unit is connected to a card read-write unit which accepts one or more so-called "smart cards". Postage meter use information is written into and read from one of these cards. The postage expanded by the card user is stored in the card memory and can be displayed or printed out as desired. The system is applicable to delivery services other than postal mail which involve a franking operation.

29 Claims, 4 Drawing Sheets

34 Department 123 - Credit Control

36 Period October 1986

| Print Value (38) | Quantity (40) | Value (42) |
|---|---|---|
| .12 | 10 | 1.20 |
| .17 | 20 | 3.40 |
| .18 | 3 | .54 |
| .22 | 4 | .88 |
| | 7 | 4.92 |
| TOTAL (44) | 44 (44) | 10.94 (44) |

FIG. 3

34 Department 123 - Credit Control

| Date (46) | Quantity (48) | Value (50) |
|---|---|---|
| 10/1/86 | 14 | 3.10 |
| 10/2/86 | 7 | 1.19 |
| . | . | . |
| . | . | . |
| . | . | . |
| 10/31/86 | 12 | 1.94 |
| Period (Oct.) (52) | 137 | 25.54 |

FIG. 4

34 Department 123 - Credit Control

| 54 Date | .12 Qty (56) | .17 Qty (58) | Other Qty (60) | Total Value (62) |
|---|---|---|---|---|
| 10/1/86 | 4 | 3 | 0 | 0.99 |
| 10/2/86 | 5 | 10 | 1 | 3.30 |
| . | . | . | . | . |
| . | . | . | . | . |
| . | . | . | . | . |
| 10/31/86 | 2 | 7 | 0 | 1.43 |
| 52 Period (Oct.) | 137 | 48 | 10 | 31.80 |
| 64 Y to D | 1031 | | | 298.40 |

FIG. 5

ACCOUNTING PERIOD POSTAGE SPENT STATEMENT

Beginning of period: 1st July 1987

End of period: 31st July 1987

User Terminal ID No.:xxxx

| User ID | Budget | Spent | Variance | Piece Count |
|---|---|---|---|---|
| 0011 | 200.00 | 328.00 | -128.00 | 4534 |
| 0012 | 200.00 | 16.39 | 183.61 | 329 |
| 0013 | 200.00 | 177.65 | 22.35 | 123 |
| 0014 | 1500.00 | 1367.40 | 132.60 | 4435 |
| 0015 | 2500.00 | 2611.10 | -111.10 | 12000 |
| 0016 | 3000.00 | 2839.70 | 160.30 | 10888 |
| Total (£) | 7600.00 | 7340.24 | 259.76 | |
| Total pieces | | | | 32309 |

FIG. 6

POSTAL CHARGE ACCOUNTING SYSTEM

This application is a continuation of application Ser. No. 07/423,690, filed Oct. 18, 1989, now abandoned which application is a continuation, of application Ser. No. 153,304, filed Feb. 8, 1988, now abandoned.

TECHNICAL FIELD

This invention relates to electronic postage meter systems and, more particularly, to a multiple smart card accounting system for use with electronic postage meters.

BACKGROUND AND OBJECTS OF THE INVENTION

A postage meter typically includes a printer to print postal indicia on a mail piece and a so-called vault for securely holding the postal meter funds. Ascending and descending registers are provided within the vault to record total meter usage and remaining funds, respectively. The vault is securely connected to the printer so that any use of the meter to print postage will be added to the ascending register to increase the record of total life cycle meter usage and will be charged against the descending register to reduce the amount of available funds remaining. The vault is recharged in a known manner, as by being taken to authorized postal authorities to have the descending register reset to reflect a corresponding payment.

Extensive effort has heretofore been made to ensure the security of the postal funds within the vault. Thus, many alternative vault recharging systems have been proposed and extensive efforts have been directed at ensuring that postage cannot be fraudulently or accidentally printed without being added or charged respectively to the ascending and descending registers within the vault. See, for example, U.S. Pat. No. 4,218,011 entitled "Coupon Controlled Metering Device," U.S. Pat. No. 4,629,871 entitled "Electronic Postage Meter System Settable By Means of a Remotely Generated Input Device", United Kingdom Pat. No. 2,173,738A, entitled "Secure Transport of Information Between Electronic Stations", Japanese Patent disclosure Nos. 1986-[Showa-61]-240,360 and 1986-[Showa 61]-240,369 both entitled "Postage Processing Machine", and Japanese public disclosure No. 712493/1987 entitled "Mail Charge Processing Apparatus". However, no significant effort has heretofore been directed to accounting for postage meter use other than to provide the cumulative information recorded in the ascending and descending meter registers as to total life cycle meter usage and available funds remaining. Thus, where a single postage meter is used by several persons or departments there is no convenient method of accurately accounting for meter usage for internal or external accounting purposes.

One proposed system for controlling a network of postage meters is disclosed in European Patent Application No. 86 108929.0 of SMH Alcatel Ltd. entitled "Process and System for Controlling Postage Meters", published Jan. 7th, 1987 under publication No. 0,207,492. At present, the prospect of obtaining regulatory approval of such a system by the Postal Authorities of U.K. or U.S.A. is questionable. The proposed SMH Alcatel system cannot readily be retro-fitted to existing postage meters and obtaining regulatory approval of the redesigned SMH Alcatel postage meter, if obtainable, would be costly and time consuming. In short, the SMH Alcatel system does not provide a satisfactory postage meter accounting system. Similar systems are disclosed in some of the previously mentioned British patent and Japanese disclosure documents. A similar system not involving use of integrated circuit cards is disclosed in an SMH Alcatel European Patent Application No. 86108930.8 published on Jan. 14th, 1987 under publication No. 0,208,231, entitled "Remote Control System for Postage Meters".

Therefore, it is one object of the present invention to provide a convenient postal charge accounting system.

It is another object of the present invention to provide a convenient postal charge accounting system which can be used in conjunction with the existing security features of an electronic postage meter.

It is yet a further object of the present invention to provide a postal charge accounting system which may be retrofitted to existing electronic postage meters in the field.

Another object of the invention is to provide a postal charge accounting system which provides detailed departmental accounting.

These and other highly desirable objects and advantages are obtained in a convenient yet secure postal charge accounting system.

Objects and advantages of the invention are set forth in part herein and in part will be obvious herefrom, or may be learned by practice with the invention, the same being realized and attained by means of the instrumentalities and combinations pointed out in the appended claims.

SUMMARY OF THE INVENTION

In accordance with the present invention, a postage meter charge accounting system is provided in which a control unit is connected to an electronic postage meter and to a card read-write unit adapted to receive one or more integrated circuit cards having memory and a microprocessor (so called "smart cards"). One example of a "smart card" is described in European Published Patent Application No. 198642.

In the preferred embodiment the control unit inhibits operation of the postage meter unless a valid smart card carrying appropriate identifying information rendering it capable of use with the corresponding meter is placed in the card read-write unit. The smart card receives a signal indicating the postage value setting from the meter and a confirmation that the postage value has been printed. The smart card sorts, collates, and stores the information received from the meter as to monetary amount and quantity of particular items of postage printed, all in a predetermined manner for later display and/or printing. Preferably, one smart card is provided to each account having access to the meter, such as each of several corporate departments, in order to monitor departmental postage meter use. Alternatively, one postage meter could be shared between several persons or separate businesses, and each person or business would have his/its own smart card. In this way, small businesses and individuals for whom the capital or maintenance expense of a postage meter is undesirably high could share use of a meter with no loss of individual control over their own funds and would enjoy accurate and secure accountability in their mailing or despatch activities.

In addition, it is contemplated that a personal computer could be attached to the postage meter in communication with the control unit and/or card read-write unit in order to provide detailed periodic summary accounting information.

Using the same general concepts, it is also possible for the Postal Authorities, or a private courier or delivery service, to make available to its customers the use of a postage meter on a 24-hours-a-day basis. In this advantageous embodiment of the present invention, the courier service or Post Office makes a postage meter of the kind herein described available 24 hours a day to its customers in a room to which access is gained through a door opened by insertion of a suitable coded token. The smart card referred to could serve additionally as an identifying token by providing each customer's card with a suitable identifying code part of which opens the access door.

In operation, a smart card for dedicated use with a particular postage meter is assigned to each user of postage meter services, such as an internal corporate department. To activate the postage meter a user places a card in the read-write unit and, if necessary, enters an identification code into the control unit keyboard in a known manner. After confirming that the card is valid for use with the postage meter the control unit activates the postage meter. The card, via the controller and appropriate interfaces, then interrogates the postage meter for postage value setting information and confirmation that postage has been printed. The card then sorts, collates and stores the postage meter use information received from the meter in a preset format appropriate for the user's needs. The card may be left in the card read-write unit to collect information throughout a given mail processing session, and removed at the end of the session. Upon removal of the card the control unit disables the meter until another valid smart card is placed in the read-write unit.

Through the control unit keyboard the user may request a display of the postal use information stored on the card. This information may simply be displayed on the meter display. In the preferred embodiment including a personal computer it is contemplated that the information stored in the card may be read from the card and written into the memory of the personal computer. In practice, it is contemplated that all of the individual cards distributed to departments could be read in this manner, such as at the end of a given accounting period, so that the personal computer obtains from the cards a record of all postage meter use during that accounting period. It is further contemplated that computer software for the personal computer could display and print the postage meter use information in a variety of formats. By way of example only, the personal computer could display and/or print desired details or summaries or postage meter use by each card holder, during the accounting period. This might include details of daily meter use, the quantity of particular postage values printed on a daily or period basis, or total meter usage by day or period.

As an extra (optional) check that the card system accounts for all postage meter use in a given accounting period, it is contemplated that an additional card could be used to monitor comprehensive "item count" and "total setting" meter values at the beginning and end of each accounting period. These values could then be cross-checked against the cumulative information collected from the cards.

Advantageously, since the vault remains at all times within the postage meter, the control unit and associated card read-write unit forming part of the present invention can be retro-fitted to existing electronic postage meters in a known manner through a communications link. Of course, it is also contemplated that future electronic meters could be designed and built to include the control unit and card read-write unit in one integrated structure. However, since the traditional approved vault-printer arrangement within the meter is maintained, both the stand alone and integrated postage meter accounting system according to the invention should comply with existing regulatory provisions.

Thus, there is disclosed herein a postal charge accounting system which provides accounting for postage meter use by any desired number of separate users. In addition, the system according to the present invention advantageously can be retro-fitted to existing electronic postage meters and can be expanded to include a personal computer to generate comprehensive accounting reports.

It will be understood that the foregoing general description and the following detailed description as well are exemplary and explanatory of the invention but are not restrictive thereof.

BRIEF DESCRIPTION OF THE DRAWINGS

The accompanying drawings, referred to herein and constituting a part hereof, illustrate principles and preferred embodiments of the present invention, and together with the description serve to explain the principles of the invention, in which:

FIG. 3 is a first example of a postage meter accounting report;

FIG. 4 is a second example of a postage meter accounting report;

FIG. 5 is a third example of a postage meter accounting report.

FIG. 6 is a fourth example of a postage meter accounting report; and

DETAILED DESCRIPTION OF THE PREFERRED EMBODIMENTS

Figure 1:
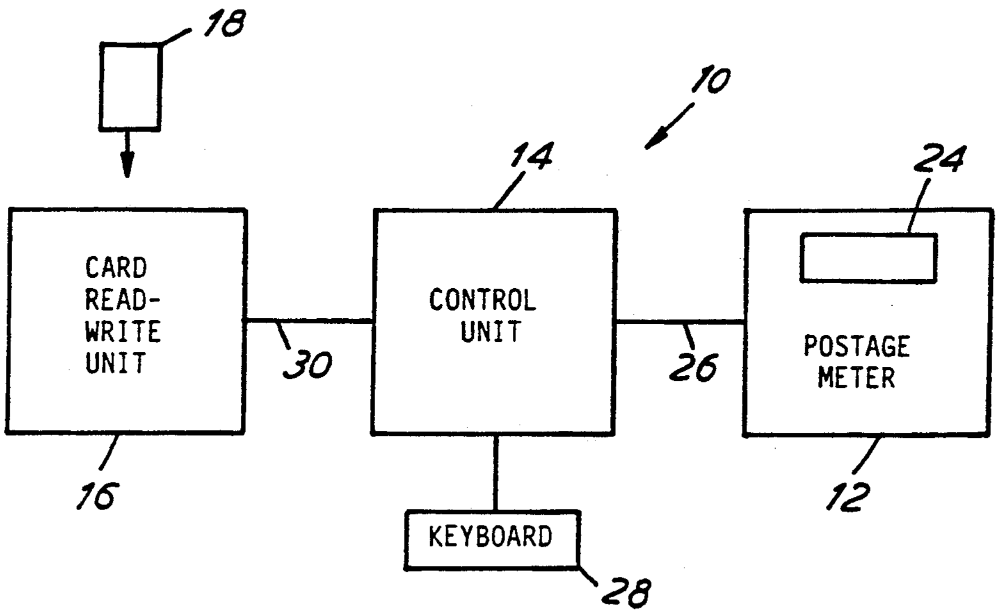
FIG. 1 is a block diagram of the postage meter accounting system in accordance system in accordance with one embodiment of the invention.

Referring now to the drawings, there is shown in block diagram form one example of a postal charge accounting system 10 in accordance with the invention having an electronic postage meter 12 connected to a control unit 14, a card read-write unit 16, and at least one integrated circuit card 18. Postage meter use information is stored on cards 18 and can be displayed when desired. In the preferred embodiment, the system according to the invention further includes a personal computer 20 (see FIG. 2) and an associated read-write unit 22 for reading the cards 18 to obtain postage meter use information an generate accounting reports such as illustrated in FIGS. 3 to 5.

Referring more specifically to FIG. 1, electronic postage meter 12 includes a display 24. Examples of electronic postage meters appropriate for use with the present invention include electronic postage meters available from the assignee of the present application, Pitney Bowes Inc. of Stamford, Conn., under the model designation numbers 6500 or 6900. The foregoing postage meters need not be modified other than by being connected to control unit 14 in a known manner through a communications link 26. Control unit 14 is provided with a keyboard 28 which is used in place of the keyboard of the control panel provided on meter 12. The meter display 24, on the other hand, remains active. Control unit 14 is connected to an integrated circuit card read-write unit 16 by a communications link 30 and at least one integrated circuit or so-called "smart" card 18 is provided. The preferred smart card is a non-contact integrated circuit card containing memory space and available from The General Electric Company p.l.c., Chelmsford, Essex. Advantageously, the General Electric smart card may readily be provided with security features useful in the present invention for restricting use of the postage meter to designated accountable entitites, e.g. specific persons, specific businesses or corporate departments, and/or for restricting use of any given card to a specified postage meter. In addition, the General Electric smart card advantageously derives its power from the card read-write unit. Appropriate smart card read-write units are available from the smart card manufacture.

In practice, a set of smart cards 18 dedicated for use with a given meter 12 are distributed to those accountable entities authorized to use postage meter 12. To use the meter, a person places smart card 18 in the card read-write unit 16 and, if the system is so equipped, enters an authorization code into keyboard 28 of control unit 14. The control unit, which inhibits use of meter 12 in the absence of an authorized card, confirms that the card inserted into the card read-write unit is valid for use with postage meter 12 and, if appropriate, confirms that the authorization code entered by the user onto keyboard 28 is proper.

Upon presentation of valid user card control unit 14 activates postage meter 12 for use. The postage meter is used in the normal fashion to print postage indicia with the appropriate data entries being made in a traditional manner to the ascending and descending registers in the meter vault. In addition, during each postage printing transaction the postage meter use information, e.g. the value and quantity of postage items is printed, is transmitted via communication links 26 and 30, control unit 14, and card read-write unit 16 to card 18 disposed the card read-write unit. The card is left in the card read-write unit throughout the postage processing session to record the value and quantity of all items of postage processed. Upon removal of the card from read-write unit 16, the control unit 14 deactivates meter 12.

The card stores the value and number of postal items printed in a format designed to conform to the user's needs. For example, the card could be programmed to store the quantity of particular item values printed, such as the most common postage values, with a running total of all such items printed. The card may also be programmed to record the number and total of all other items printed, i.e. those item values which are not routinely printed, and a running total of all items printed by the user. Since the smart card is readily provided with a clock, all of the foregoing information can be monitored for any given period, i.e. day, week, month, etc. The data stored on the smart card can be accessed by entering a display instruction into keyboard 28 to display the postage meter use information of the accountable entity owning that smart card on the postage meter display 24.

Figure 2:
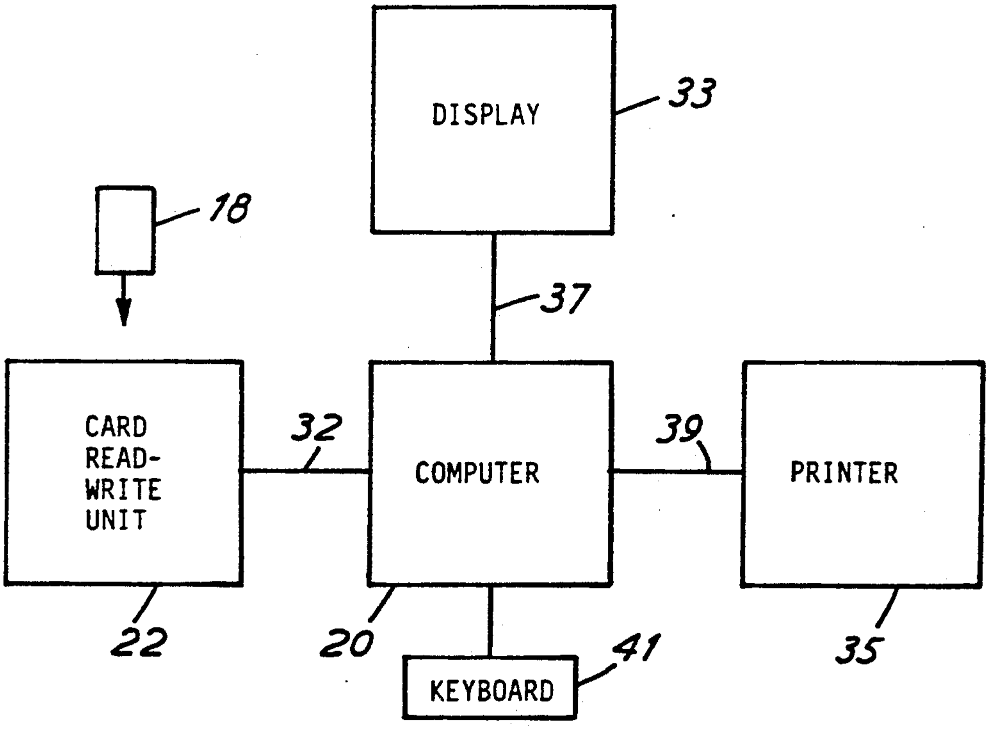
FIG. 2 is a block diagram of part of a second embodiment of the postage meter accounting system in accordance with the invention including a computer for generating accounting reports.

In a preferred alternative embodiment of the invention shown in FIG. 2, a computer 20, such as a personal computer, is connected in a known manner by a communications link 32 to a second card read-write unit 22. Of course, it is contemplated that card read-write units 16 and 22 could be one and the same. The computer is provided with an appropriate program within the skill in the art enabling the computer to interact with the card read-write unit 22 to receive postage meter use information from a card 18 inserted into card read-write unit 22. In this manner, if desired, all cards may be periodically collected from accountable entities and read in card reader 22 to transfer the postage meter use information from the cards to the computer memory. It is contemplated that the cards could simultaneously be cleared during this information transfer process so that they are ready to commence another accounting period.

The information transferred from the cards to computer 20 thus constitutes an accounting for all use of meter 12 for the given accounting period. Advantageously, the computer may be programmed to store, display and/or print the postage meter use accounting information in a variety of formats. Toward this end, computer 20 is connected to display 33 and/or printer 35 by communication links 37 and 39, respectively, and a keyboard 41. By way of example only and not by way of limitation, three accounting formats for displaying and/or printing the postage use information for a given accountable entity are shown in FIGS. 3 through 5. In each of these illustrations the accountable entity is shown as a hypothetical "Department 123-Credit Control".

As shown in FIG. 3, computer 20 may be programmed to generate an accounting report showing the type and value of postage transactions undertaken by the accountable entity during the accounting period. As shown at 34, for example, the identity of the hypothetical accountable entity is given. The accounting period 36, here "October 1986", is given and columns 38, 40, 42 respectively identify the value, quantity and total cumulative value of each type of postage item printed. In column 30, designated "Print Value", the value of each type of postage item of postage being monitored is listed. In column 40 the quantity of items corresponding to the item types listed in column 38 is given, with a total value for each type of item set forth in column 42. As shown, at the bottom of each column totals 44 are given.

A second example accounting report is shown in FIG. 4. In this example a daily summary of activity is given. Columns 46, 48, 50 indicate the date, quantity and total value of postage items printed by the hypothetical Department 123 during the accounting period, here October 1986. This configuration takes advantage of the clock provided within card 18 to store information on a daily basis. For any given data listed in column 48, the total quantity of items printed and their total money value are shown in columns 48 and 50, respectively. Of course, the period total can be given as shown on line 52.

Referring now to FIG. 5, there is shown a third example of an accounting report in accordance with the invention. This more comprehensive reporting format gives a daily summary of all postage meter usage for the period, including the quantity of specific postage item values printed on any given day during the period. In addition, cumulative year to date usage information is provided. Once again in FIG. 5 the usage of the hypothetical Department 123 for the period October 1986 is shown. In column 54 each date on which use of the postage meter occurred is displayed. In columns 56 and 58 the quantity of particular postage value items of interest printed on the corresponding date of column 54 is shown. Column 60 shows the quantity of other types of postage items making up the remaining value of postage printed on that day is shown. Column 62 lists the total monetary value of all postage printed on each day listed in column 54. Once again, the total quantity and monetary value figures for the period are shown on line 52. As shown on line 64, it is contemplated that the computer could be programmed to provide, on a year to date basis, a running total of the quantity and total monetary value of postage printed. Programming for a year to date tabulation based on prior periodic reports within the computer memory is within the skill of the art.

Of course, it is contemplated that item values, etc., other than those shown in the foregoing illustrations may be desired. It is also contemplated that the other report formats may rove desirable or useful such as, for example, monthly or year end reports of meter usage by all departments.

Preferably, an additional smart card is provided to collect and store from meter 12 the "item count" and "total setting" values kept within the meter. Thus, where this data is collected at the beginning and end of each accounting period this information can be cross-checked to ensure that all meter usage has been accounted for. In addition to a cross check of total meter usage, this information would permit calculation of usage information for a single lost card.

In an advantageous embodiment of the invention, which can be employed when several departments of a single firm have their own smart cards and these departments share a single postage meter provided with the card read-write facility outlined above, each card may have set therein a credit limit. That is, when a user inserts a card into the meter and attempts a franking operation which, if carried out, would result in the total funds expended by that user exceeding the credit limit, the postage meter is disabled. This facility could also be useful when several businesses share uses of a single postage meter.

In another advantageous embodiment of the invention, each card may have preset therein a budge figure. This can be exceeded as it is not a credit limit. The card is programmed so that when inserted into the card read-write unit, there is displayed (or can be printed out) a report which includes variances from the budget figures. One example of such a report is shown in FIG. 6. It will be appreciated that the different users identified in FIG. 6 by the I.D. 0011 to 0016 could be different departments of a single firm, or different persons or businesses who are sharing use of the same postage meter equipment.

Figure 7:
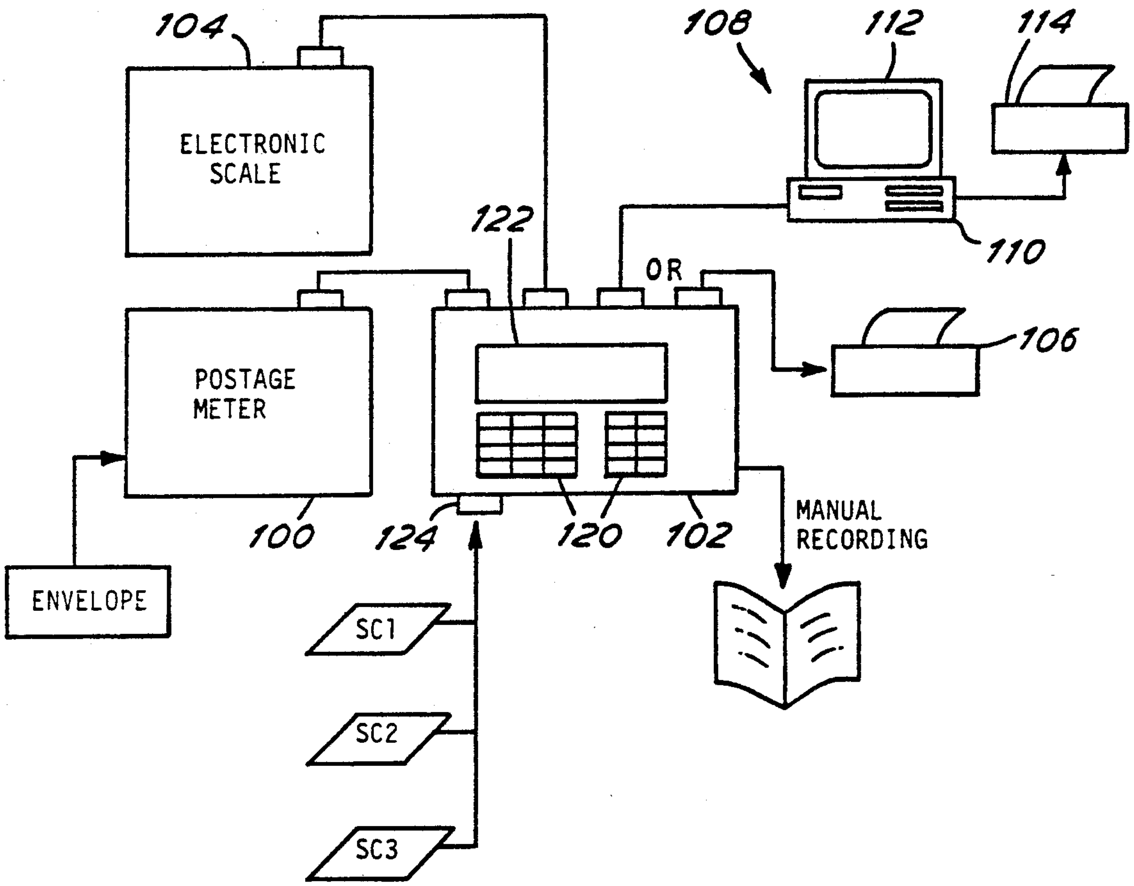
FIG. 7 is a block diagram of a third embodiment of a system according to the invention.

Referring now to FIG. 7, this illustrates a relatively sophisticated postage meter accounting system according to the invention. The illustrated system includes a postage meter 100 connected to a user terminal 102 via a conventional communications link. An electronic weighing scale 104 and, optionally, a printer 106 are also connected to the terminal 102. Instead of the printer 106, an administration unit 108 may be connected to the user terminal 102, the unit 108 including a desk top microcomputer 110, its VDU 112 and a printer 114. The user terminal 102 includes a keyboard 120, a display 122, and a card read-write unit 124. Also shown are smart cards SC1, SC2 and SC N. It will be appreciated that the system can accommodate a plurality of users each having their own smart card.

In another alternative embodiment of the invention, not illustrated, the smart card of one or more particular users may be programmed to operate in a way particularly desired by that user. For example, a smart card could carry therein extra programming which obtains and maintains a separate but subsidiary total for the postage expanded on all those items upon which the postal cost was more than a predetermined limit. As another example, if one particular user required his reports to be displayed or printed in a particular format, then a program would be incorporated in his smart card which, when the card is inserted into the card read-write unit, is read into terminal unit 102 to instruct the display portion thereof to use the required format.

Thus, the present invention provides a versatile multi-user postage meter accounting system. The system in accordance with the invention advantageously may be retro-fitted to existing electronic postage meters in the field. Indeed, since the vault always remains within the meter and only an external electrical connection to the supplemental accounting system is provided, the present system is consistent with and should not conflict with existing postage meter regulations. Of course, it is contemplated that in the future it may be desirable to provide the meter, control unit and card read-write unit as a single integrated meter. However, since the vault and postage printing functions remain within the meter in a traditional manner, integrating the control unit and card read-write unit into the meter housing should still comply with existing postal regulations.

In addition, the preferred embodiment including a computer connected to a card read-write unit permits more extensive accounting than could be achieved with a stand-alone card accounting system and provides added versatility to the types of accounting reports that can be generated.

To the extent not already indicated, it will be understood that the invention in its broader aspects is not limited to the specific embodiments herein shown and described but departures may be made therefrom within the scope of the accompanying claims, without departing from the principles of the invention and without sacrificing its chief advantages.

As the principles of the present invention are applicable to making payment for a variety of delivery services, the words "postage" and "postal" when used herein are to be construed broadly, and not as limited to the activities of the Postal Authorities.

What is claimed is:

1. A postal charge accounting system comprising:

a) an electronic postage meter including internal accounting registers;

b) control unit means connected to said postage meter for controlling said meter;

c) at least one user smart card programmed for processing postage meter use information, wherein said user smart card is dedicated for use with said postage meter and said said postage meter use information includes data entries made to said internal accounting registers; and d) card read-write unit means connected to said control unit means for reading said postage meter use information from and writing said postage meter use information into said user smart card.

2. The system according to claim 1 wherein said control unit means activates said meter for use when an authorized card is inserted into said card read-write unit means, and deactivates said meter in the absence of said authorized card.

3. The system according to claim 2 wherein said card read-write unit means receives said postage meter use information from said postage meter and transmits said postage meter use information to said card, said card storing said postage meter use information in memory within said card.

4. The system according to claim 3 wherein said postage meter use information stored in said card is read by said card read-write unit means and is transmitted to said control unit means for display.

5. The system according to claim 4 wherein said control unit means transmits said postage meter use information read from said card to said electronic postage meter for display on a display panel of said meter.

6. The system according to claim 3 further comprising computer means connected to said read-write unit means for receiving said postage meter use information from said card when said card engages and communicates with said card read-write unit means.

7. The system according to claim 6 wherein said computer means is configured and programmed to receive said postage mete use information from a plurality of user smart cards.

8. The system according to claim 7 wherein said computer means generates postage meter use accounting reports from said postage meter use information.

9. The system according to claim 8 wherein said postage meter use information includes, for each postage meter transaction, the monetary value of the postage printed.

10. The system according to claim 7 wherein at least one of said cards has a budget figure preset therein, and said computer means generates postage meter use accounting reports from said postage meter use information, including variances from said budge figure.

11. The system according to claim 4 wherein said card is programmed with format information and said control unit means effects said display in accordance with said format information.

12. The system according to claim 7 wherein at least one of said cards is programmed with format information and said computer means effects display of of said processed postage meter use information in accordance with said format information.

13. A postal charge accounting system comprising:

a) an electronic postage meter including internal accounting registers;
b) control unit means connected to and communicating with said postage meter;
c) at least one user smart card programmed for processing postage meter use information, said user smart card being dedicated for use with said postage meter, said postage meter use information including data entries made to said internal accounting registers;
d) first card read-write unit means connected to said control unit means for receiving said postage meter use information from said control unit and writing said postage meter use information into said card;
e) computer means for generating accounting reports; and
f) second card read-write unit means connected to said computer means for reading said postage meter use information from said card and providing said information to said computer means, such that said computer means generates said accounting reports based upon said postage meter use information.

14. The system according to claim 13 further comprising a plurality of integrated circuit cards.

15. The system according to claim 14 wherein at least one of said cards is provided to each of a plurality of accountable entities such that each of said accountable entities can control and monitor its postage meter use.

16. The system according to claim 15 wherein said second card read-write unit means reads said postage meter use information from each of said cards and transmits said postage meter use information to said computer means.

17. The system according to claim 16 wherein said postage meter use information includes, for each postage meter transaction, value of postage printed during said transaction and identity of said accountable entity effecting said transaction.

18. The system according to claim 17 wherein said postage meter use information includes, for each date or period of postage meter use, a quantity of one or more items of specific postage values printed on that date.

19. A postal charge accounting system comprising:

a) an electronic postage meter including internal accounting registers;
b) control unit means connected to said postage meter for controlling said postage meter;
c) a plurality of user smart cards dedicated for use with said meter, each of said cards being programmed for processing postage meter use information, said postage meter use information including data entries made to said internal accounting registers;
d) card read-write unit means connected to said control unit means for reading said postage meter use information from and writing said postage meter use information into any one of said cards inserted into said card read-write unit means;
e) said control unit means being arranged to activate said meter for use when said one card is inserted into said card read-write unit means, wherein said postage meter use information is transmitted by said meter, said control unit means and said read-write unit means to said one card, said one card storing said postage use information; and
f) means for displaying said postage meter use information read from said one card.

20. The system according to claim 19 wherein said means for displaying said postage meter use information further comprises computer means connected to said card read-write unit means for reading said postage meter use information from said cards.

21. The system according to claim 20 wherein said computer means generates accounting reports based upon said postage meter use information read from said cards.

22. The system according to claim 1 wherein said user smart card has a credit limit set therein, and further includes means which disables said meter when a user attempts a transaction which if effected would result in the said credit limit being exceeded.

23. The system according to claim 1 in which the said user smart card has a code stored in a portion of its memory whereby access may be obtained via a security door to a location provided with at least said postage meter and said card read-write unit means.

24. The system according to claim 1 wherein said accounting parameters include date of postage transaction, postage value and identity of accountable entity.

25. The system according to claims, 1, 13 and 19, wherein said processing of said postage meter use information includes sorting, collating and storing.

26. The system according to claim 4, in which said meter was previously in use and said control unit means, said card, and said read-write unit means have been retrofitted to form the system, by connecting said control unit means to said meter through a communication link.

27. The system according to claim 14, in which said meter was previously in use and said control unit means, said cards, and said read-write unit means have been connected to said meter through a communication link to form the system.

28. A postal charge accounting system comprising:

a) an electronic postage meter including internal accounting registers;

b) user terminal means connected to said meter;

c) an electronic weighing scale connected to said terminal means;

d) printer means coupled to said terminal means for printing information generated by the accounting system;

e) a plurality of user smart cards programmed for processing postage meter use information, wherein each of said cards is dedicated for use with said postage meter and said postage meter use information includes data entries made to said internal accounting registers; and f) card read-write unit means connected to said user terminal means for reading said postage meter use information from and writing said postage meter use information into said card.

29. The system according to claim 28 further comprising a computer means connected to and between said user terminal means and said printer means for receiving said postage meter use information and performing administrative tasks.

* * * * *